United States Patent [19]

Acoraci

[11] 4,316,192

[45] Feb. 16, 1982

[54] BEAM FORMING NETWORK FOR BUTLER MATRIX FED CIRCULAR ARRAY

[75] Inventor: Joseph H. Acoraci, Phoenix, Md.

[73] Assignee: The Bendix Corporation, Southfield, Mich.

[21] Appl. No.: 90,836

[22] Filed: Nov. 1, 1979

[51] Int. Cl.[3] .......................... G01S 1/14; H01Q 3/36; H01Q 3/40

[52] U.S. Cl. ............................... 343/100 SA; 343/854

[58] Field of Search ............. 343/100 SA (U.S. only), 343/854

[56] References Cited

U.S. PATENT DOCUMENTS 3,797,019 3/1974 Shestag et al. ........... 343/100 SA X 3,999,182 12/1976 Moeller et al. ............... 343/100 SA 4,163,974 8/1979 Profera ..................... 343/100 SA X

*Primary Examiner*—Malcolm F. Hubler

*Attorney, Agent, or Firm*—W. G. Christoforo; Bruce L. Lamb

[57] ABSTRACT

A circular multimode antenna array having N radiating elements, an NXN Butler matrix and N-1 phase shifters includes feed networks comprising a back fill-in network, a sum pattern power divider network, a difference pattern power divider network and a sum-difference combiner network. The various networks are used either alone or in simultaneous combination to provide sum and difference circular antenna patterns having omnidirectional side lobes.

2 Claims, 10 Drawing Figures

BEAM FORMING NETWORK FOR BUTLER MATRIX FED CIRCULAR ARRAY

The Government has rights in this invention pursuant to Contract No. DAAB07-77-C-2176, awarded by the Department of the Army.

BACKGROUND OF THE INVENTION

This invention relates to radar antennas and particularly to circular radar antenna arrays and the feed networks therefor.

In the usual air traffic management system a ground radar station transmits an interrogation message throughout its sphere of interest. A transponder equipped aircraft operating within the sphere of interest and receiving the interrogation message automatically transmits a response message whose exact format depends upon the exact format of the interrogation message. More particularly, the ground station transmits the interrogation message along a narrow beam into the sphere of interest. The direction from the ground station of an aircraft whose response is received at the ground station is known since the responding aircraft must normally be within the narrow beam in order to be interrogated and to thus respond. A coding scheme is used to ensure that aircraft which are not within the narrow beam do not respond to the interrogation message carried on the narrow beam side lobes. The coding scheme provides that the initial portion of the interrogation message consists of three coded pulses, designated P1, P2 and P3 transmitted by the ground station in that order. Pulses P1 and P3 are transmitted only on the narrow beam and pointed in the specific predetermined direction from the ground station, while pulse P2 is transmitted omnidirectionally. As a result, an aircraft within the narrow beam hears pulses P1 and P3 of relatively high amplitude and pulse P2 of relatively low amplitude and aircraft outside the narrow beam perceive pulses P1 and P3 of relatively low amplitude. The aircraft transponder includes decoding circuits which recognize the aforesaid pulse coding to allow only aircraft within the narrow beam to respond.

Those aircraft which are outside the narrow beam and which receive the P1 and P2 pulses, where P2 is of greater amplitude than P1 will be suppressed, that is, they will not respond during a short predetermined time thereafter even though they may be interrogated during that time by the proper interrogation message. This interrogation message which a transponder receives during its suppression period might, for example, be transmitted from a second, further removed, ground station whose sphere of interest should not extend into this sphere of interest of the first mentioned ground station but which because of atmospheric or siting problems now does. It can be seen that should a transponder respond to interrogation from said second ground station the first ground station will interpret the response erroneously, that is, it will interpret that response as being indicative of an aircraft in the pointing direction of its narrow beam which, in this case, of course, the responding aircraft is not. It is thus important that an aircraft located within the sphere of interest of a particular ground station have its transponder actively suppressed whenever it is out of the main narrow beam of that ground station.

As might be expected, it is also important that the interrogation beam of each ground station be as narrow as possible for good target resolution, that is, to permit different aircraft within a particular sphere of interest but closely spaced in azimuth with respect to the ground station to be individually interrogated.

SUMMARY OF THE INVENTION

In practicing the preferred embodiment of the present invention a circular phased array antenna was chosen since it provides a uniform azimuth pattern with a well defined, common RF phase center and superior side lobe suppression. The antenna is fed by a Butler matrix which accomplishes an electrical transform by converting a linearly array amplitude and phase distribution, steered to some angle at its input, into the amplitude and phase distribution required by a circular array steered to a corresponding angle. Steering over 360 degrees with uniform low side lobes is accomplished by controlling only the relative phase of the signals at the Butler matrix input. The antenna feed network, in addition to the above mentioned Butler matrix, includes a plurality of phase shifters which feed the Butler matrix and which steer the antenna beam pattern. Generally, one phase shifter is provided for each Butler matrix mode input except for the mode input which, for the particular design of a feed network, is terminated. In the embodiment to be described below diode phase shifters are used.

The phase shifters are driven by electronic steering circuitry which accepts a steering command and converts it into commands for the individual shifters.

An azimuth pattern beam forming network is comprised of a back fill-in network, a sum pattern network, a low side lobe difference pattern network and a network for combining the sum and difference patterns generated by the sum and difference pattern networks. The azimuth pattern beam forming network provides two sets of drive signals, depending on whether a sum pattern input terminal or a difference pattern input terminal thereof is energized, which are applied through the phase shifters and Butler matrix to the antenna elements. The first set of drive signals or weights, generated when the sum pattern input terminal is excited, is, in essence, the sum of two subset of weights. One subset of weights for an omnidirectional antenna pattern and the other subset of weights is for a low side lobe sum antenna pattern. When these subsets are summed to produce the first set of drive weights, the resultant antenna pattern is a sum pattern having omnidirectional side lobes. The aforementioned P1 and P3 pulses are transmitted by this antenna pattern so that an aircraft anywhere in the antenna side lobe will hear the P1 and P3 pulses, while an aircraft in the main beam will hear the same P1 and P3 pulses but at a higher signal level.

The back fill-in network couples power from the difference pattern input terminal, when that terminal is excited, to the sum pattern input terminal, thus producing the aforementioned first set of drive weights for a sum pattern having omnidirectional side lobes, but somewhat attenuated because of the power division in the back fill-in network.

The back fill-in network also couples power from the difference pattern input terminal to provide a third subset of weights for providing another omnidirectional antenna pattern. The remaining power on the difference pattern input terminal is applied to a difference pattern network which generates a fourth subset of weights for a difference antenna pattern. The four subsets of weights are combined to produce the second set of drive weights which, as applied through the phase shifters and Butler matrix to the antenna elements results in a difference antenna pattern having omnidirectional side lobes as will be explained fully below.

The above mentioned P2 pulse is transmitted by this difference antenna pattern so that an aircraft anywhere in the antenna side lobe will hear the P2 pulse but an aircraft within the null will not hear the P2 pulse or will hear it greatly attenuated.

DESCRIPTION OF THE PREFERRED EMBODIMENT

Figure 1:
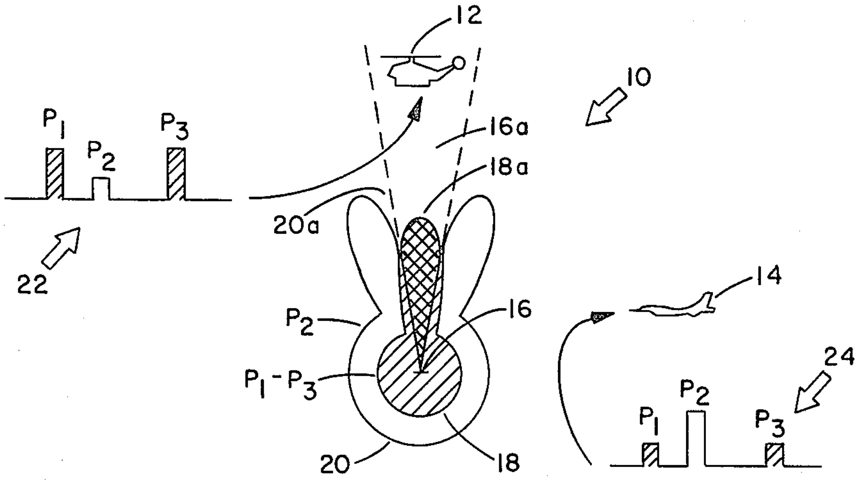
FIG. 1 shows the antenna beam patterns produced by the present invention.

Refer to FIG. 1 where a ground based air traffic control station, represented to be at the common RF phase center 16 of the antenna beam patterns 18 and 20, interrogates a sphere of interest 10. Two aircraft 12 and 14 assumed to have on board transponders are shown operating in sphere of interest 10. The types of interrogation messages transmitted by a ground station are well known to those skilled in the art and need not be described here except to note that what is known in the art as the P1, P2 and P3 pulses are of interest in explaining this invention. As known in the art, the P1, P2 and P3 pulses are transmitted in that order by the ground station on a predetermined schedule. The ideal ground station transmits these pulses so that an aircraft operating in a known small segment, for example, segment 16*a* of sphere of interest 10, hears the P1 and P3 pulses relatively unattenuated and the P2 pulse greatly attenuated as, for example, illustrated as waveform trace 22. Additionally, the ideal ground station transmits the pulses so that at the same time an aircraft operating in the sphere of interest but outside of the above mentioned small segment hears pulses P1 and P3 attenuated but pulse P2 relatively unattenuated, as illustrated by aircraft 14 and waveform trace 24.

The standard technique to accomplish the above is the use of a sum antenna pattern such as pattern 18 (shown shaded) to transmit the P1 and P3 pulses and a difference antenna pattern, such as pattern 20 to transmit the P2 pulse. The terms sum and difference applied to antenna patterns are notations for the two patterns usually employed in monopulse work. They result if an antenna consisting of an even number of elements is separated into two equal halves and each half is driven 180 degrees out of phase. When the drive is applied to the in-phase or sum port of a 180 degree hybrid, both halves of the antenna contribute in-phase components to form a uniform directional pattern, for example, beam 18*a*. If, however, the hybrid difference port is driven, the two halves of the array are 180 degrees out of phase. This causes a sharp null, for example, null 20*a*, to develop at boresight with the opposing signals cancelled.

Figure 2:
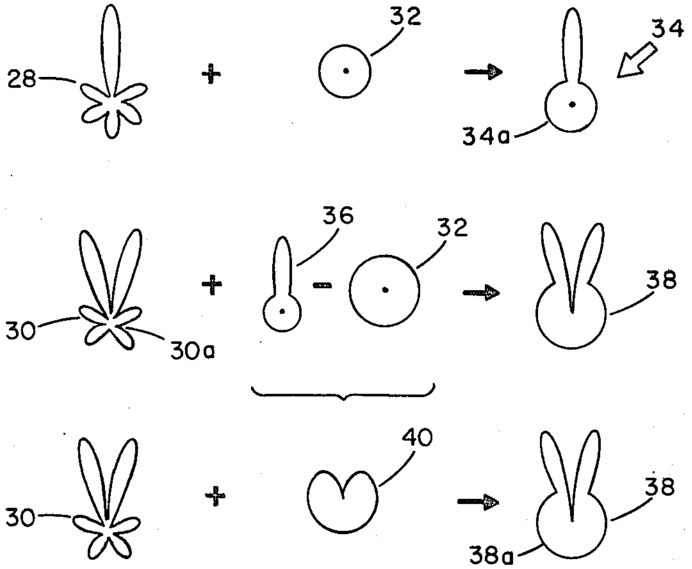
FIG. 2 illustrates the synthesis of the patterns of FIG. 1.

It can be appreciated that should a ground station radiate only the sum and difference of antenna patterns as described above, it may occur that an aircraft in the sphere of interest 10 but outside segment 16*a* may fail to hear the P2 pulse, since the various antenna patterns are usually deeply lobed, such as shown by the antenna pattern 30 of FIG. 2, if the aircraft is in a lobal null, for example, null 30*a* of FIG. 2. It is thus preferable for the ground station to produce antenna beam patterns having the omnidirectional side lobes illustrated in FIG. 1.

Refer now to FIG. 2 which illustrates the synthesis of the beam patterns of FIG. 1 and which aids in describing the invention. As can be seen, a sum antenna beam pattern having an omnidirectional side lobe 34*a* is produced by combining a standard sum antenna beam pattern having deep side lobes 28 with an omnidirectional antenna beam pattern 32. Combining a deeply side lobed difference antenna beam pattern 30 with a cardioid antenna beam pattern 40 produces a difference antenna beam pattern 38 having an omnidirectional side lobe 38*a*. Cardioid antenna beam pattern 40 is produced by combining the omnidirectional antenna beam pattern 32 with an antenna beam pattern 36 which is similar to antenna beam pattern 34 except somewhat attenuated and shifted 180 degrees in phase.

Figure 3:
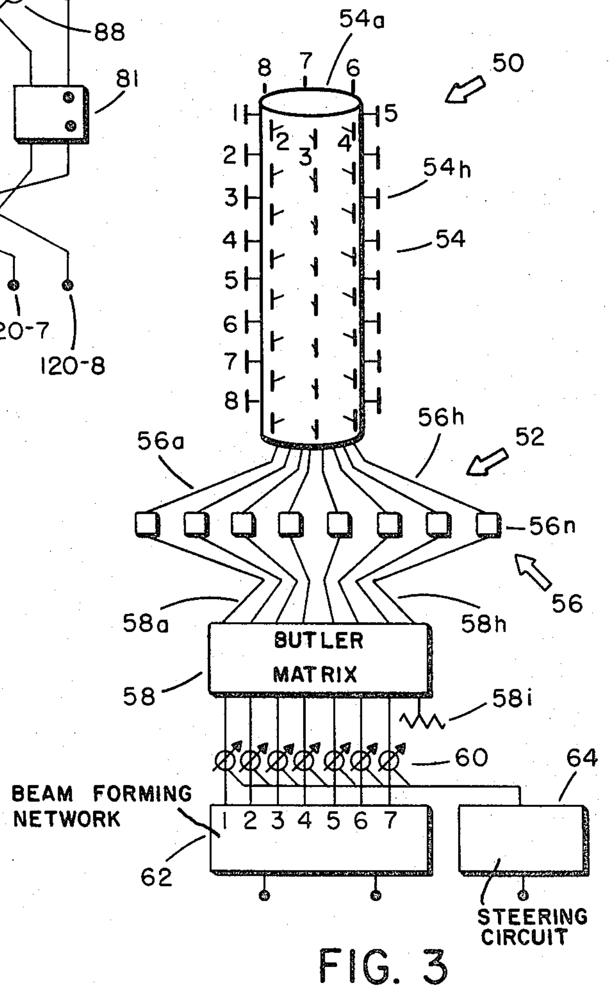
FIG. 3 shows a cylindrical phased array antenna suitable for use in an air traffic control system.

Refer now to FIG. 3 which shows a circular multimode antenna array 50 and the feed networks therefor 52. A more common name for the type of antenna arrangement is a Butler matrix fed cylindrical array. As standard in the art, all components used in the arrangement are preferably reciprocal. The arrangement thus has the same properties for both transmit and receive. For convenience the following discussion will generally describe the arrangement in the transmit mode.

The arrangement consists of the following main parts: a radiating aperture 54, elevation pattern beam forming networks 56, a Butler matrix 58, phase shifters 60, an azimuth pattern beam forming network 62 and steering electronics 64 for the phase shifters 60.

The radiating aperture 54 of this embodiment consists of 64 dipole elements 54*n* where 8 columns of 8 dipole elements each are equally spaced around a cylinder 54*a* which comprises the dipole ground planes. In a unit actually built cylinder 54*a* had a five inch diameter. The dipoles are positioned vertically and therefore the antenna radiates with vertical polarization.

Each column of 8 dipole elements 54*n* is connected to one of 8 identical elevation pattern beam forming networks 56*n*. Each such network is an 8-way, unequal power divider which has one input and 8 outputs, each of which is connected individually to a different dipole element comprising the associated radiating aperture column. The amplitudes and phases at the various output lines 56*a* to 56*h* will yield the proper distribution to generate the elevation pattern. Power dividers 56 are conventional and need not be further described.

Figure 4:
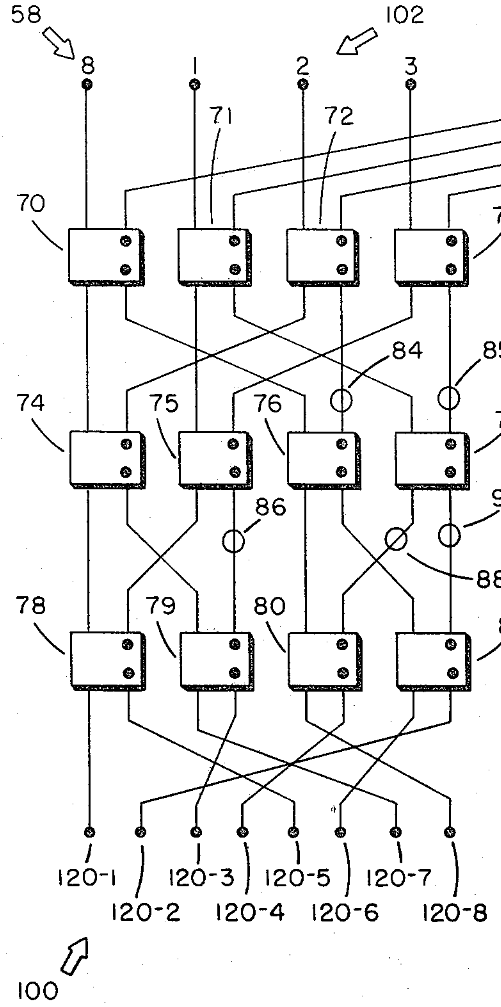
FIG. 4 shows the Butler matrix in greater detail.

The power divider input terminals are individually connected by lines 58*a* to 58*h* to associated output terminals of Butler matrix 58 which is seen in greater detail at FIG. 4, reference to which figure should now be made. Butler matrix 58 performs the standard mathematical transform of a linear array, here comprised of eight weights applied at its input ports 120-1 through

120-8, to a circular array, here comprised of eight weights at its output ports 1 through 8. Butler matrices and their operation are well known to those skilled in the art. Briefly, Butler matrices generally, and the Butler matrix of FIG. 4 are passive and reciprocal microwave devices. With respect to FIG. 4, a signal into any input port 120-1 through 120-8 results in signals of equal amplitude and a linear phase gradient at output ports 1 through 8. The phase gradient is determined by which input port is excited. Exciting a single input port results in a specific far field radiation or mode pattern from antenna 54 of FIG. 3. The antenna pattern in this case will have an omnidirectional amplitude and a linearly varying phase gradient. In the present embodiment, the desired antenna pattern is obtained by exciting seven of the eight input ports with a set of weights which deprive the desired antenna pattern in linear array format. This set of weights will be comprised of signals having the proper amplitude and phase as known to those skilled in the art. Port 120-8 is known in the art as the 180 degree mode. Exciting this mode produces a scalloped antenna pattern and thus this port is not normally excited but rather is terminated with a matched load as will be explained below.

The present Butler matrix is comprised of twelve 180 degrees hybrids 70 through 81, three 90 degrees fixed phase shifters 84, 85 and 86, a 45 degree fixed phase shifter 88 and a 135 degrees fixed phase shifter 90.

Figure 5:
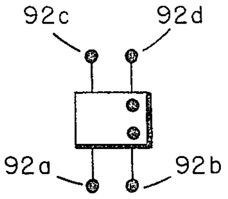
FIG. 5 illustrates the hybrid convention of FIG. 4.

The hybrid convention is illustrated at FIG. 5, reference to which should now be made. A typical hybrid has an undotted input port 92*a*, a dotted input port 92*b*, an undotted output port 92*c* and a dotted output port 92*d*. A signal at undotted input port 92*a* is split into two equal amplitude, in phase signals at output ports 92*b* and 92*d* respectively. A signal at dotted input port 92*b* is split into two equal amplitude signals at the output ports, where the signal at dotted output port 92*d* is phase shifted 180 degrees with respect to the input signal and the signal at the undotted output port 92*c*.

Figure 6:
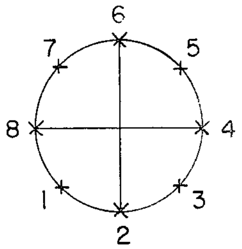
FIG. 6 is a plan section view of the antenna of FIG. 3.

Refer now to FIG. 6 which shows the interconnection of the matrix output ports of FIG. 4 with the columns of antenna elements 54*n* of antenna 50 of FIG. 3. The columns are numbered 1 to 8 and correspond to their associated matrix output ports 1–8 of FIG. 4. Of course, interconnection is through the elevation beam forming networks 56*n* of FIG. 3.

One skilled in the art can now easily determine the operation of the Butler matrix of FIG. 4.

Returning to FIG. 3, steering the antenna patterns is achieved in the conventional manner by applying a linear phase gradient at the mode inputs, that is at the input terminals to the Butler matrix 58. This is accomplished through the use of the phase shifters 60. Proper adjustment of the various phase shifters will cause the antenna patterns to steer to a mechanical angle that is the same as the electrical phase gradient angle across the various phase shifters. In the present embodiment seven phase shifters 60 are used, one for each Butler matrix mode input port, the unused mode input port being terminated with a matched load 58*i* as previously explained. The phase shifters are identical to one another and are conventional 6-bit digital devices (180 degrees, 90 degrees, 45 degrees, 22.5 degrees, 11.25 degrees and 5.625 degrees) and are the PIN diode type (4-bits reflective type and 2-bits loaded line type). Applying the phase gradient, using the 6-bit shifters illustrated, allows for the azimuth beam to be scanned from 0 degrees to 360 degrees in 5.625 degrees steps for a total of 64 beam positions.

The phase shifters are controlled by the steering electronic circuitry 64 which supplies the 7 phase shifters with appropriate 6-bit words for each of the 64 beam positions. The use of digital phase shifters and steering electronics and the embodiments thereof are well known in the art and need not be further described here.

Figure 7:
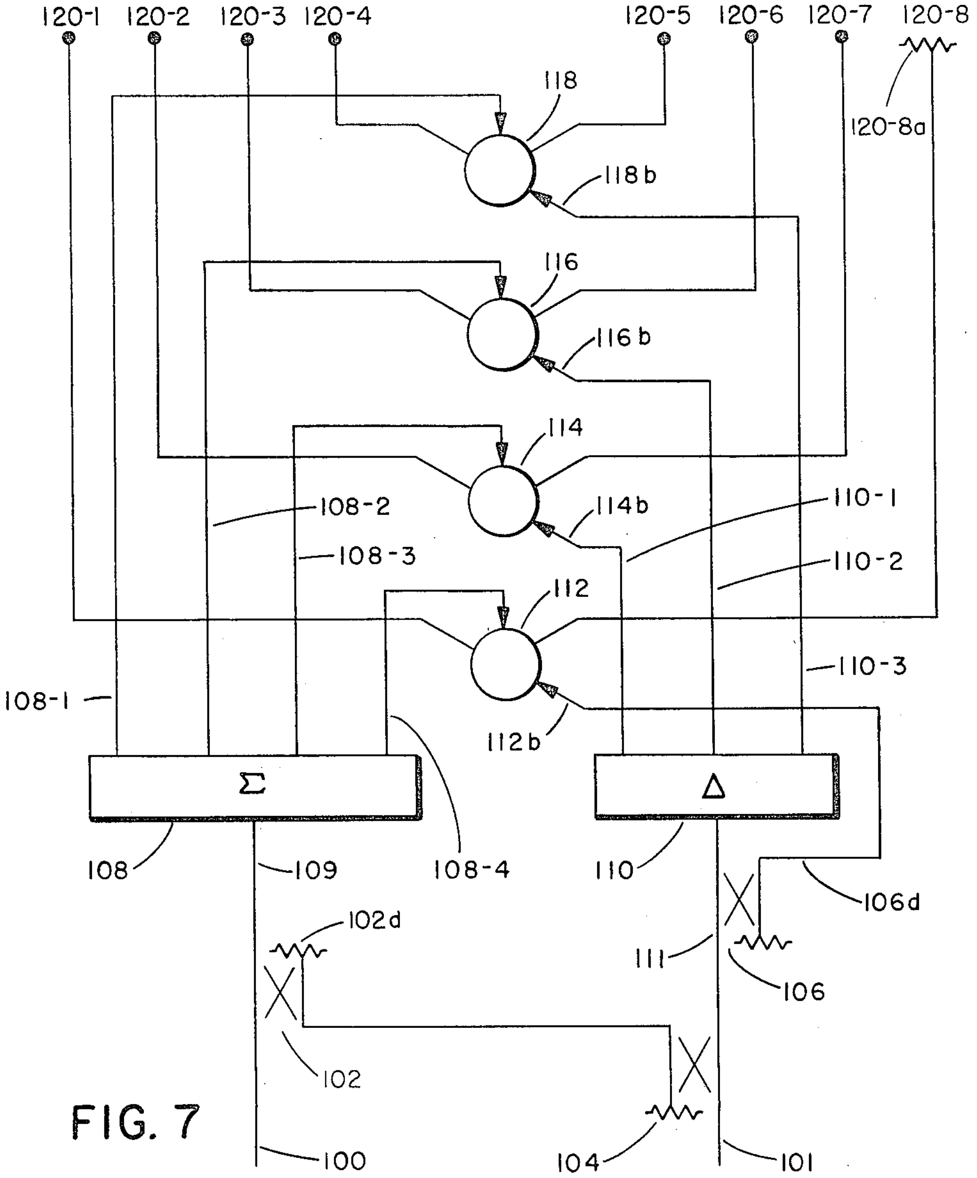
FIG. 7 is a block diagram of the RF feed network for the antenna of FIG. 3.

Refer now to FIG. 7 which shows the antenna pattern beam forming network 62 of the invention. This network, for the eight element antenna mentioned above, includes power dividing elements, such as directional couplers 102, 104 and 106, power combining elements such as circulators 112, 114, 116 and 118, a sum pattern network 108 and a difference pattern network 110. A sum pattern input port 100 is so termed because exciting this port will cause network 62 to generate the signals or weights at output terminals 120-1 to 120-8 required for an 8-element linear array to produce the sum antenna pattern 34 of FIG. 2. A difference pattern input port 101 is so termed because exciting this latter port will cause network 62 to generate the set of signals or weights at output terminals 120-1 to 120-8 required for the 8-element linear array to produce the difference antenna pattern 38 of FIG. 2. Of course, if steerable phase shifters are interposed between terminals 120-1 to 120-8 and the antenna elements, the various antenna patterns can be steered in accordance with steering signals applied to the phase shifters as known to those skilled in the art and mentioned above. It will be remembered, as explained with respect to FIG. 3, that not only are steerable phase shifters connected to the output terminals of beam forming network 62 but also a Butler matrix is provided to transform the linear array weights generated by network 62 to circular array weights. Because of the simple array transform performed by the Butler matrix, further description of beam forming network, for simplicity, will be with respect to a linear array. It will also be noted that terminal 120-8 is terminated in characteristic impedance 120-8*a* while Butler matrix of FIG. 3 has its corresponding input port terminated with characteristic impedance 58*a*.

It is known as mentioned above, that for a multielement phased array fed from a Butler matrix, exciting only one matrix input port produces an omnidirectional antenna pattern. Thus, returning to FIG. 7, exciting output terminal 120-1 only will provide an omnidirectional antenna pattern such as pattern 32 of FIG. 2. It is also known that exciting all the input ports of a Butler matrix with in-phase signals and whose individual levels are chosen according to a suitable weighting function such as a Taylor weighting function will produce a low side lobe sum antenna pattern such as pattern 28 of FIG. 2. It is also known that exciting all the input ports of a Butler matrix with signals of whose level is chosen in accordance with a suitable weighting function and where the signals exciting the elements to one side of the array are 180 degrees out-of-phase with respect to the signals exciting the elements to the other side of the array will produce a difference antenna pattern such as pattern 30 of FIG. 2.

Figure 8:
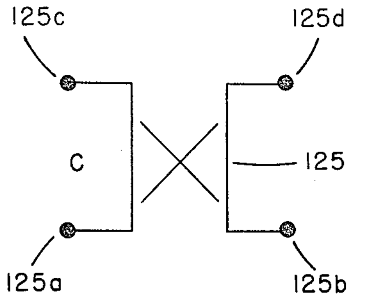
FIG. 8 illustrates the directional coupler convention of FIG. 7.

Before proceeding with this description of FIG. 7 it is instructive and helpful to understand the convention used in illustrating the hybrids and directional couplers thereof. A representative hybrid is shown in FIG. 8, reference to which should be made. A directional coupler 125 is shown having a coupling factor C, input terminals 125*a* and 125*b* and output terminals 125*c* and 125*d*. Exciting input terminal 125*a* distributes power according to coupling factor C to output terminals 125*c* and 125*d*. In like manner exciting input terminal 125*b* distributes power according to coupling factor C to output terminals 125*c* and 125*d*. There is insignificant coupling between input terminals.

Figure 9:
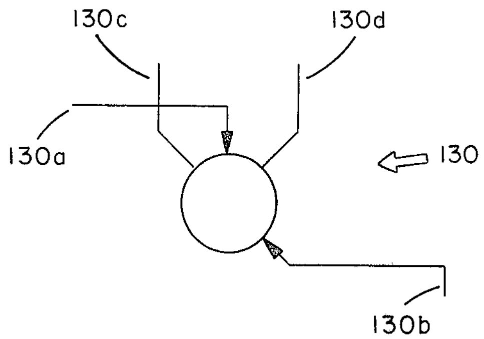
FIG. 9 illustrates the hybrid convention of FIG. 7.

Refer now to FIG. 9 which illustrates a typical hybrid 130 having input terminals 130*a* and 130*b* and output terminals 130*c* and 130*d*. Exciting either input terminal distributes power equally to both output terminals. If input terminal 130*a* is excited the power at the output terminals is in-phase. If input terminal 130*b* is excited the signal at output terminal 130*c* is shifted 180 degrees with respect to the signal at output terminal 130*d*, which in turn is in-phase with the input excitation.

Returning now to FIG. 7, it is first desired to generate at output terminals 120-1 to 120-8 the linear array weights to produce antenna pattern 34 of FIG. 2. This is done by superimposing at the output terminals the weights to produce sum pattern 28 of FIG. 2 simultaneously with the weights to produce omnipattern 32. From the earlier discussion it is known that proper weights to produce the sum pattern can be selected by consideration of an appropriate weighting function. Considering, in particular, a Taylor weighting function, the proper weights for the sum pattern are found to be:

| Terminal | dB | Phase |
|---|---|---|
| 120-1 | 0.0 | 0.0 |
| 120-2 | −1.32 | 0.0 |
| 120-3 | −5.53 | 0.0 |
| 120-4 | −13.27 | 0.0 |
| 120-5 | −13.27 | 0.0 |
| 120-6 | −5.53 | 0.0 |
| 120-7 | −1.32 | 0.0 |

Next, remembering that excitation of only one output terminal produces an omnidirectional pattern, and examining the hybrids of FIG. 6, it is seen that hybrid 112 feeds output terminals 120-1 and 120-8, but that latter terminal is terminated by impedance 120-8*a*. Thus terminal 120-1 can be excited to produce the omnidirectional pattern.

One must now consider the desired relative strengths of the antenna field patterns 28 and 32 of FIG. 2 to produce the omnidirectional field pattern 32 which when added to antenna field pattern 28 will result in antenna field pattern 34. In the embodiment built it was desired that the omnidirection field strength be −25 db with respect to the main beam field strength of field pattern 28. It was also desirable that the fields be added in phase quadrature to attenuate field ripple problems. Adding the two subsets of weights corresponding to a sum pattern and omnidirectional pattern respectively in phase quadrature gave the following set of weights to produce antenna field pattern 34:

| Terminal | dB | Phase |
|---|---|---|
| 120-1 | 0.0 | +22.0 |
| 120-2 | −1.98 | 0.0 |
| 120-3 | −6.19 | 0.0 |
| 120-4 | −13.93 | 0.0 |
| 120-5 | −13.93 | 0.0 |
| 120-6 | −6.19 | 0.0 |
| 120-7 | −1.98 | 0.0 |

The above weights are generated in sum pattern network 108 and then evenly divided by hybrids 112, 114, 116 and 118. Thus, sum pattern network 108 generates at its output terminals the following relative weights:

| Terminal | dB | Phase |
|---|---|---|
| 108-1 | −13.93 | 0.0 |
| 108-2 | −6.19 | 0.0 |
| 108-3 | −1.98 | 0.0 |
| 108.4 | 0.0 | +22.0 |

Figure 10:
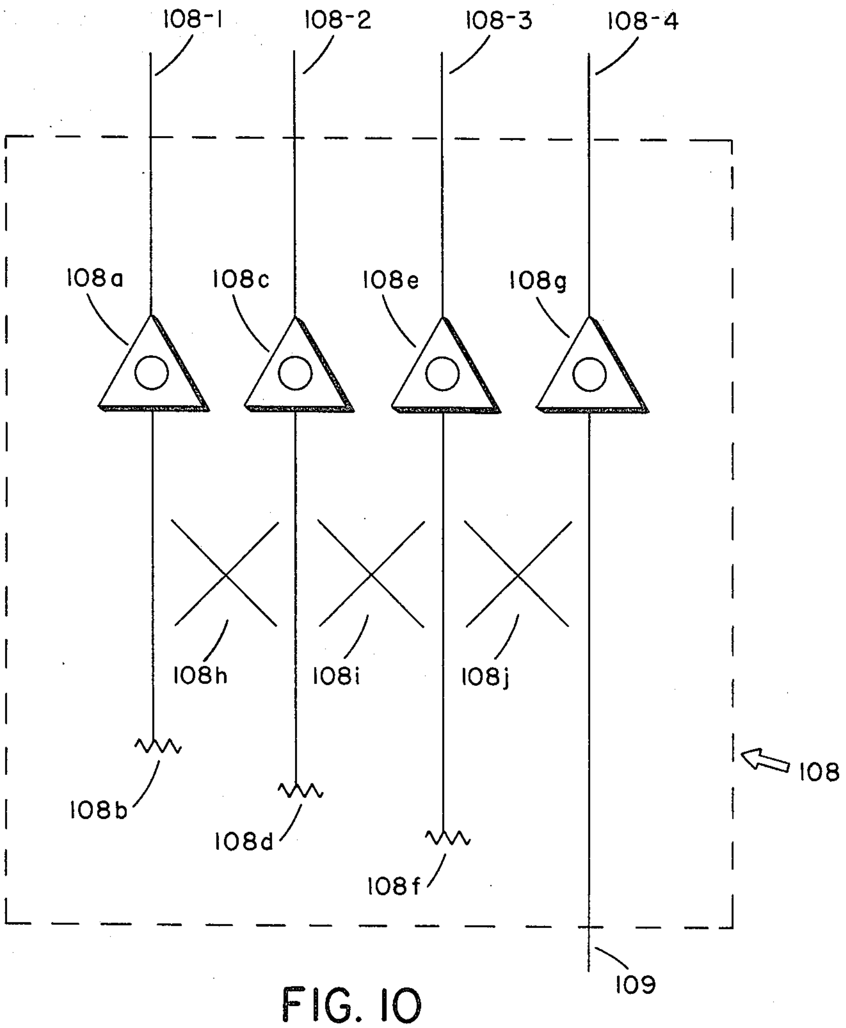
FIG. 10 shows the sum pattern network at FIG. 7 in greater detail.

A suitable sum pattern network 108 is seen at FIG. 10, reference to which should now be made. As mentioned above, sum pattern network is a 4-way unequal power divider having directional couplers 108*h*, 108*i* and 108*j*. Input terminal 109 is connected through fixed phase shifter 108*g* to output terminal 108-4 and through the directional couplers 108*j*, 108*i* and 108*h* to the other output terminals 108-3, 108-2 and 108-1, respectively. The second directional coupler input terminals are terminated in the characteristic impedances 108*a*, 108*d* and 108*f* to eliminate any power reflections therefrom. The fixed phase shifters 108*a*, 108*c* and 108*e*, as well as fixed phase shifter 108*g* are provided to obtain the proper signal phasing listed in the above table. The coupling factors of the various directional couplers are, of course, designed to provide the desired output signal levels.

The sum beam pattern 34 of FIG. 2 is thus produced, in linear field array weight format at output terminals 120-1 to 120-8 merely by exciting network input terminal 100 since directional coupler 102 effectively blocks any input power from appearing on line 102*c*.

The difference beam pattern 38 of FIG. 2 is produced, in linear field array weight format at output terminals 120-1 to 120-8, by exciting network input terminal 101. In this case power on terminal 101 is divided onto terminal 109 through directional couplers 104 and 102. From the above discussion it should now be obvious that by so exciting terminal 109 a sum beam pattern identical to pattern 34 is produced in linear field array weight format at output terminals 120-1 to 120-8 except that the field strength of the sum beam pattern will be in accordance with the terminal 109 excitation signal level. The sum beam pattern 36 of FIG. 2 having the appropriate field strength is easily set by the design of directional couplers 102, 104 and 106.

Power on input terminal 101 is further divided by directional coupler 106 onto terminal 106*d*, which is connected into hybrid 112. Reviewing the convention of FIG. 8, it is seen that exciting terminal 106*d* causes output terminal 120-1 to be excited by a 180 degree phase shifted signal. Thus, exciting terminal 106*d* causes the omnidirectional beam pattern 32 of FIG. 2 to be produced in linear field array weight format at output terminals 120-1 to 120-8 simultaneously with the sum beam pattern but 180 degrees phase shifted. Such superposition of weights is equivalent to subtracting one beam pattern from the other to thereby produce cardioid beam pattern 40 of FIG. 2.

The remaining power on input terminal 101 excites input terminal 111 of difference pattern network 110. It is this latter network which generates the signals for producing difference pattern 30 of FIG. 2. By considering an appropriate weighting function, here the Taylor weighting function modulated by a sine wave, the power distribution of difference pattern network 110 can be determined. Network 110, like network 108 of FIG. 10, can consist of the proper number of directional couplers and fixed phase shifters. In this embodiment the following power distribution was used to produce difference antenna beam pattern 38 of FIG. 2 where the omnidirectional side lobe was 15 db down from the maximum signal envelope and normalizing the power on terminal 110-1:

| Terminal | dB | Phase |
|---|---|---|
| 110-1 | 0.0 | 0.0 |
| 110-2 | −0.72 | 0.0 |
| 110-3 | −12.15 | 0.0 |

The power distributed by directional couplers 102, 104 and 106 is the following, where power on terminal 111 is normalized:

| Terminal | dB | Phase |
|---|---|---|
| 109 | −8.39 | 0.0 |
| 106d | −6.2 | 0.0 |
| 111 | 0.0 | 0.0 |

The resulting weights at terminals 120-1 to 120-7, with the signal on terminal 120-7 normalized, is as follows to produce difference field pattern 38 of FIG. 2:

| Terminal | dB | Degree |
|---|---|---|
| 120-1 | −6.52 | 180 |
| 120-2 | −2.27 | 180 |
| 120-3 | −2.56 | 180 |
| 120-4 | −14.45 | 180 |
| 120-5 | −12.13 | 0.0 |
| 120-6 | −1.05 | 0.0 |
| 120-7 | 0.0 | 0.0 |

It can be seen that the connection of terminals **106*d*, 110-1, 110-2 and 110-3, respectively, to hybrid input terminals 112*b*, 114*b*, 116*b* and 118*b* provides the aforementioned 180 degrees phase shift between the weights of the first four output terminals 120-1 to 120-4** and the other output terminals to produce a difference field pattern.

Having described my invention and the preferred embodiment, it should now be possible for one skilled in the art to make modifications and alterations thereof by following my teachings. For example, different forms of power dividers can be used rather than the directional couplers illustrated. Different forms of power combiners are also known and can be substituted for the hybrids shown. The invention is also adaptable for use with array having other than 8 elements by merely changing the number of power divisions by sum and difference pattern networks 108 and 110, and the number of power combiners, such as hybrids 114, 116 and 118. Accordingly, the invention is to be limited only by the true spirit and scope of the appended claims.

I claim:

1. A beam forming network for an antenna array including:

a first input terminal (100);

first means (108) responsive to excitation of said first input terminal for generating a first set of weights corresponding to a sum pattern antenna beam having omnidirectional side lobes;

a second input terminal (101);

second means (110) responsive to excitation of said second input terminal for generating a first subset of weights corresponding to a difference pattern antenna beam;

third means (106) responsive to excitation of said second input terminal for generating a second subset of weights corresponding to an omnidirectional antenna beam;

means for combining (112, 114, 116, 118) the weights generated by said first, second and third means;

N output terminals (120-1 to 120-8) connected to receive the weights from said combining means; and, means unidirectionally coupling (102, 104) excitation energy from said second input terminal (101) to said first input terminal (100) but not coupling excitation energy from said first input terminal to said second input terminal, whereby excitation of said first input terminal causes said first set of weights to be generated but said first and second subsets are not generated so that the weights corresponding to a sum pattern antenna beam having omnidirectional side lobes are received at said N output terminals and whereby excitation of said second input terminal causes said first input terminal also to be excited so that weights corresponding to difference pattern antenna beam having omnidirectional side lobes are received at said N output terminals.

2. The beam forming network of claim 1 additionally:

a circular antenna array (50) having N antenna elements;

an N port Butler matrix (58), the output ports of said Butler matrix being connected respectively to said antenna elements;

N-1 phase shifters (60), each having an input terminal connected respectively to an output terminal of said beam forming network and having an output terminal connected to an associated one of the input ports of said Butler matrix, one of said weights (**58*i***) being the characteristic impedance of one antenna element, the Butler matrix port unassociated with a phase shifter being terminated in said characteristic impedance.

* * * * *